United States Patent [19]

Kamata et al.

[11] Patent Number: 4,558,098

[45] Date of Patent: Dec. 10, 1985

[54] METHACRYLIC RESIN COMPOSITION

[75] Inventors: Kazumasa Kamata, Tokyo; Yoshio Nakai, Iwakuni; Yasunori Shimomura, Ohtake, all of Japan

[73] Assignee: Mitsubishi Rayon Co., Ltd., Tokyo, Japan

[21] Appl. No.: 563,021

[22] Filed: Dec. 19, 1983

[30] Foreign Application Priority Data

Dec. 28, 1982 [JP] Japan ............................. 57-233082
Dec. 28, 1982 [JP] Japan ............................. 57-233083
Dec. 29, 1982 [JP] Japan ............................. 57-229864

[51] Int. Cl.$^4$ ..................... C08L 25/14; C08L 33/12; C08L 35/06
[52] U.S. Cl. ................... 525/207; 525/285; 525/74
[58] Field of Search ..................... 525/207, 285

[56] References Cited

U.S. PATENT DOCUMENTS 4,181,788 1/1980 Wingler et al. .

FOREIGN PATENT DOCUMENTS 767255 11/1971 Belgium .
56-43242 4/1981 Japan .
56-81332 7/1981 Japan .

OTHER PUBLICATIONS

Derwent Abstract corresponding to Japanese Provisional Patent Publication No. 81322/1981.

*Primary Examiner*—Carman J. Seccuro
*Attorney, Agent, or Firm*—Brumbaugh, Graves, Donohue & Raymond

[57] ABSTRACT

There is provided a heat-resistant methacrylic resin composition, which comprises 1 to 99% by weight of a copolymer [I] obtained by copolymerizing methyl methacrylate, an aromatic vinyl compound and maleic anhydride and 99 to 1% by weight of a copolymer [II] obtained by copolymerizing 80 to 100% by weight of methyl methacrylate and 0 to 20% by weight of other copolymerizable ethylenic monomer.

The resin composition according to the present invention is excellent in characteristics such as optical characteristics, mechanical properties, weathering resistance and molding processability as well as in productivity.

18 Claims, No Drawings

METHACRYLIC RESIN COMPOSITION

BACKGROUND OF THE INVENTION

This invention relates to a transparent heat-resistant methacrylic resin composition.

Methacrylic resins containing methyl methacrylate as the main component are very excellent in optical properties and weathering resistance, and also have relatively well-balanced performances in mechanical properties, thermal properties and molding processability. Therefore, by taking advantages of these characteristics, they are utilized widely in a large number of fields, including sign boards, covers for illumination, nameplates, automobile parts, parts of electrical instruments, decorative or miscellaneous goods. Further, developments for uses of these resins are also now under progress.

However, in one aspect, heat resistance is not sufficient with the heat distortion temperature being around 100° C., and there are a considerable number of fields for which developments of uses are limited. Thus, there continues to exist persistent demand for improvement of heat resistance.

There have been proposed a large number of methods for improvement of heat resistance of methacrylic resins, including, for example, the method in which methyl methacrylate is copolymerized with α-methylstyrene; the method in which methyl methacrylate, α-methylstyrene and maleic anhydride are copolymerized (Japanese Patent Publication No. 10156/1974); the method in which methyl methacrylate, styrene and maleic anhydride are copolymerized (Japanese Patent Publication No. 43242/1981); the method in which methyl methacrylate, α-methylstyrene, styrene and maleic anhydride are copolymerized (Japanese Provisional Patent Publication No. 81322/1981); the method in which poly-α-methylstyrene is dissolved in methyl methacrylate before polymerization of methyl methacrylate (Japanese Patent Publication Nos. 1616/1968 and 8718/1974); the method in which methyl methacrylate and N-allyl maleic acid imide are copolymerized (Japanese Patent Publication No. 9753/1968); the method in which methyl methacrylate, α-methylstyrene and maleimide are copolymerized; the method in which metyl methacrylate is copolymerized in the presence of a crosslinked polymer of a polyfunctional monomer; the method in which methyl methacrylate is copolymerized with methacrylic acid; the method in which methyl methacrylate, α-methylstyrene and acrylonitrile are copolymerized; and others. However, in the methods according to the proposals as mentioned above, polymerization rate may be extremely small to give markedly low productivity not acceptable in practical application; mechanical properties, weathering resistance and optical properties may be lowered; molded products may be markedly colored; or molding processability may be poor due to narrow molding region. Thus, in any case, under the present invention, while heat resistance may be improved to some extent, a number of problems remain to be solved.

SUMMARY OF THE INVENTION

The present inventors, in view of the state of the art as described above, have made extensive studies on a heat-resistant methacrylic resin without lowering excellent characteristics inherent in methyl methacrylate such as optical characteristics, mechanical properties, weathering resistance and molding processability, which is also excellent in productivity. Consequently, it has now been found that a resin mixture comprising a copolymer of methyl methacrylate, an aromatic vinyl compound and maleic anhydride having a specific composition and a methacrylic polymer can accomplish its object and has also an unexpected effect of being excellent in transparency in spite of the difference in refractive index between both of the resins. The present invention has been accomplished on the basis of such a finding.

More specifically, the resin composition of this invention comprises a copolymer [I] comprising methyl methacrylate, an aromatic vinyl compound and maleic anhydride and a (co)polymer [II] comprising 80 to 100% by weight of methyl methacrylate and 0 to 20% by weight of other ethylenic monomer copolymerizable therewith.

DETAILED DESCRIPTION OF THE PREFERRED EMBODIMENTS

The most characteristic feature of the composition of this invention resides in that a composition excellent in weathering resistance and colorless transparency of molded products, further well-balanced in heat resistance, solvent resistance, mechanical properties and molding processability, as compared with the copolymers as disclosed in the above-cited Japanese Patent Publication Nos. 10156/1974 and 43242/1981, and Japanese Provisional Patent Publication No. 81322/1981, can unexpectedly be obtained by blending the above-mentioned heat resistant copolymer [I] having a specific composition with high refractive index and a resin constituted mainly of methyl methacrylate with low refractive index to effect homogeneous dispersion. Particularly, the salient feature of the composition according to this invention resides in the discovery that a resin composition providing a heat distortion temperature of 105° C. or higher, preferably 110° C. or higher, more preferably 115° C. or higher, can be obtained.

Methyl methacrylate constituting the copolymer [I] in the composition according to this invention is a component which maintains optical characteristics, weathering resistance or mechanical properties inherent in methacrylic resins and improves compatibility with the copolymer [II].

The aromatic vinyl compound which is a constituent of the copolymer [I] is selected from α-methylstyrene, styrene and vinyltoluene. α-Methylstyrene is a component for improving heat resistance and it is also a component for enhancing copolymerizing reactivity with maleic anhydride. Styrene or vinyltoluene is not a component for improving directly heat resistance, but it will improve heat resistance indirectly through enhancing copolymerizing reactivity with maleic anhydride and at the same time exhibits remarkable effect on improvement of productivity.

Maleic anhydride which is another constituent of the copolymer [I] is a component which improves heat resistance of the copolymer through the interaction with α-methylstyrene, styrene or vinyltoluene.

In the present invention, since the aromatic vinyl compound contstituting the copolymer [I] is selected from α-methylstyrene, styrene and vinyltoluene, the copolymer [I] can also take several kinds of compositions.

Copolymers [I] preferable for constituting the composition of this invention may include the following:

[A]: A copolymer comprising 50 to 98% by weight, preferably 65 to 90% by weight, of methyl methacrylate; and 1 to 25% by weight, preferably 5 to 18% by weight, of α-methylstyrene and 1 to 25% by weight, preferably 5 to 17% by weight of maleic anhydride.

[B]: A copolymer comprising 50 to 98% by weight, preferably 65 to 90% by weight; 1 to 25% by weight, preferably 5 to 20% by weight, of styrene or vinyl toluene; and 1 to 25% by weight, preferably 5 to 15% by weight of maleic anhydride.

[C]: A copolymer comprising 40 to 97% by weight, preferably 60 to 90% by weight of methyl methacrylate; 1 to 20% by weight, preferably 1 to 10% by weight of α-methylstyrene; 1 to 20% by weight, preferably 5 to 15% by weight of styrene or vinyltoluene; and 1 to 20% by weight, preferably 4 to 15% by weight of maleic anhydride.

In the composition of this invention, when the level of methyl methacrylate in the above copolymers [A], [B] and [C] constituting the copolymer [I] is less than the lower limit as specified above, maintenance of the optical properties, weathering resistance or mechanical properties inherent in methacrylic resins may be impaired, while at a level in excess of the upper limit, no improvement of heat resistance can be expected. On the other hand, if the level of α-methylstyrene is less than the lower limit, the resin will be inferior in productivity and heat resistance, while an excess over the upper limit will result in lowering of mechanical properties and optical properties and, further in resistance to thermal decomposition. As to styrene or vinyltoluene component, an insufficient level will cause indirectly lowering of heat resistance, while optical properties and weathering resistance will be lowered at an excessive level. Further, an insufficient amount of maleic anhydride will give only inferior results with respect to productivity and heat resistance, while an excessive amount will lower mechanical properties and optical properties, and further deteriorate the boiling resistance.

In the composition of this invention, when considering the resin properties of the finally obtained blended resin as a whole, such as heat resistance, mechanical properties, optical properties or molding processability, it is most preferred that the copolymer [I] should have a composition satisfying the quantitative relationship in terms of moles $\alpha$ of α-methylstyrene, moles $\beta$ of styrene or vinyltoluene and moles $\gamma$ of maleic anhydride so that the ratios of the respective components $\alpha/\gamma$, $\beta/\gamma$, and $(\alpha+\beta)/\gamma$ may be in the range from 0.9 to 1.7. When these ratios are less than 0.9, water resistance and mechanical properties tend to be lowered. On the other hand, at ratios over 1.7, optical properties and heat resistance are observed to be lowered.

The copolymer [II] constituting the composition of this invention is added for the purpose of imparting weathering resistance, meahcnical properties, optical properties and molding processability inherent in methacrylic resins to the composition. The methyl methacrylate component which is the main component in the copolymer [II] is the component to impart weathering resistance, optical properties, heat resistance and mechanical properties inherent in methacrylic resins to the blended composition, and it may be used in the copolymer in an amount of 80 to 100% by weight. When the amount of methyl methacrylate employed is less than 80% by weight, the aforesaid physical properties tend to be lowered. Other ethylenic monomers to be used for copolymerization with methyl methacrylate may include acrylates of which alkyl moieties have 1 to 12 carbon atoms such as methyl acrylate, ethyl acrylate, n-butyl acrylate, 2-ethylhexyl acrylate, stearyl acrylate and the like; methacrylates of which alkyl moieties have 2 to 12 carbon atoms such as ethyl methacrylate, butyl methacrylate, 2-ethylhexyl methacrylate, stearyl methacrylate and the like, cyclohexyl methacrylate, styrene, acrlonitrile, and others. These monomers may be used singly or as a mixture of two or more kinds, in an amount ranging from 0 to 20% by weight.

The copolymer [I] and the copolymer [II] constituting the composition of this invention may be formulated at a proportion of 1 to 99% by weight of the copolymer [I] and a proportion of 99 to 1% by weight of the copolymer [II]. At a level lower than 1% by weight of the copolymer [I], heat resistance will be inferior, while mechanical properties and weathering resistance will be lowered at a level in excess of 99% by weight. On the other hand, when the amount of the copolymer [II] employed is less than 1% by weight, mechanical properties and weathering resistance will be inferior, while no improvement of heat resistance can be expected with a content over 99% by weight. Therefore, in the composition of this invention, when considering the balance between heat resistance, weathering resistance, coloration characteristic of molded articles, solvent resistance, mechanical properties and molding processability, the copolymer [I] should be 5 to 95% by weight and the copolymer [II] 95 to 5% by weight. Preferably, the copolymer [I] may be 10 to 90% by weight, more preferably 15 to 85% by weight, most preferably 20 to 80% by weight and, correspondingly, the copolymer [II] may preferably be 90 to 10% by weight, more preferably 85 to 15% by weight, most preferably 80 to 20% by weight.

The composition according to this invention is particularly useful as a molding material having a melt flow rate (MFR) of 0.5 to 75 (amount of resin (g) extruded as measured according to ASTM D-1238 under the condition of 230° C., under load of 10 Kg/cm$^2$ for 10 minutes).

The composition of this invention can be produced according to any method which is not particularly limited. For example, the copolymer [I] and the copolymer [II] may be prepared by bulk polymerization according to conventional methods, the copolymer [I] and the copolymer [II] obtained are blended and thereafter melt, kneaded and extruded at temperatures ranging from 200° to 300° C., to prepare a blended resin. Alternatively, the copolymer [I] is dissolved in a monomeric mixture for preparation of the copolymer [II], followed by suspension polymerization in an aqueous medium containing a dispersant or bulk polymerization. It is also possible to employ the method in which the copolymer [II] is dissolved in a monomeric mixture for constitution of the copolymer [I], followed by bulk polymerization of the mixture.

In the composition of this invention, there may also be added additives such as an UV-absorbers, peeling agents, antioxidants, mold release agents, dyes or pigments, if necessary.

The composition of this invention, which is excellent in heat resistance, weathering resistance, colorless transparency, boiling resistance and mechanical properties, is useful for lamps of automobiles, meter coverings, etc.

This invention is illustrated in more detail by referring to the following Examples.

Evaluations of the physical properties in Examples were conducted according to the methods shown below.
(1) Melt-flow property: MFR (melt-flow rate): ASTM D-1238, amount of resin extruded in grams, at 230° C., under load of 10 Kg/cm$^2$, for 10 minutes.
(2) Heat resistance: Heat distortion temperature (H.D.T.) (°C.): ASTM D-648
(3) Mechanical properties:
   (1) Tensile strength (Kg/cm$^2$): ASTM D-638
   (2) Elongation (%): ASTM D-638
(4) Total light transmittance (%): ASTM D-1003
(5) Color tone of injection molded plate: Visual observation
(6) Weathering resistance: Accelerated exposure test, 1100 hours, Weather-o-meter produced by Suga Co., temperature: 60° C., carbon arc lamp, under rain fall for 12 minutes per hour.
(7) Boiling resistance: A test strip of 2 mm×50 mm×100 mm is immersed in pure water at 100° C. for 4 hours, and the degree of whitening is judged by visual observation.
(8) Solvent resistance: A stress of 4000 psi is applied on the fulcrum of a sample of a plate having a thickness of 2 mm, a width of 25 mm and a length of 110 mm, while wetting the fulcrum with isopropyl alcohol, and the time from commencement of measurement until development of craze or crack is measured.

EXAMPLE 1, COMPARATIVE EXAMPLES 1–3

To 1000 g of each of the monomeric mixtures containing methyl methacrylate, α-methylstyrene and maleic anhydride formulated at proportions as indicated in Table 1 was added 2.5 g of t-dodecyl mercaptan as a molecular weight controller, and the mixture was placed in a separable flask of 2-liter inner capacity equipped with a condenser, a thermometer and a stirrer. Then, under stirring, nitrogen gas was blown into the flask to purge the air in the system, and on heating the mixture to 70° C., 0.2 g of 2,2′-azobis(2,4-dimethylvaleronitrile) was added thereto, and the inner temperature was maintained at 95° C. for 15 minutes, followed by cooling to room temperature, to obtain a partially polymerized product.

To 1,000 g of the partially polymerized product were added and dissolved therein under thorough stirring 4 g of lauroyl peroxide, 3.0 g of t-dodecyl mercaptan as molecular weight controller, 0.3 g of "Tinuvin P" (trade name, produced by Ciba-Geigy AG) as an UV-absorber, 0.2 g of "JP-504" (trade name: produced by Johoku Kagaku Co.) as a peeling agent, 1 g of "Mark 329" (trade name: produced by Adeka Argus Co.) as a stabilizer and 1 g of stearic acid monoglyceride as a mold release agent. This partially polymerized mixture was poured into a mold comprising a cell formed of two tempered glass plates placed at a distance of 3 mm through an intermediary polyvinyl chloride gasket, which cell was equipped with a thermocouple, and curing by polymerization was conducted in a water bath at 80° C. Thirty minutes after confirmation of the time from immersion in the water bath until the inner temperature reaches its peak, the mold was taken out from the water bath and subjected to heat treatment in an air-heated furnace at 130° C. for 2 hours. After cooling, the glass plates were removed to obtain a resin plate with a plate thickness of about 3 mm. The plate was cut and crushed into pellets of about 3 to 4 mm.

TABLE 1

| | Composition of monomeric mixture (g) | | |
|---|---|---|---|
| | Methyl methacrylate (MMA) | α-methylstyrene (α-MeSt) | Maleic anhydride (MAH) |
| Example 1 | 700 | 160 | 140 |
| Comparative example 1 | 800 | 200 | — |
| Comparative example 2 | 800 | — | 200 |
| Comparative example 3 | — | 520 | 480 |

These pellets were blended with a methacrylic polymer [Acrypet (registered trade name) VH, produced by Mitsubishi Rayon Co.] at a weight ratio of 60/40 and molded into pellets at 200° to 270° C. by means of a vent type biaxial extruder (extrusion temperature: 270° C.).

These pellets were injection molded under the conditions shown below, and the test strips obtained (110 mm×110 mm×2 mm thick) were evaluated to obtain the results shown in Table 2.
Injection molding machine: V-17-65 Model screw type automatic injection molding machine, produced by Nippon Seikosho Co.
Injection molding conditions:
   Cylinder temperature: 250°–260° C.
   Injection pressure: 700 Kg/cm$^2$
   Mold temperature: 50° C.

TABLE 2

| Evaluation item | Example 1 | Comparative example 1 | Comparative example 2 | Comparative example 3 |
|---|---|---|---|---|
| MFR (g/10 min.) | 8.0 | 8.0 | not measured | 12.0 |
| H.D.T. (°C.) | 116 | 104 | because MMA/MAH were not copolymerized | 114 |
| Tensile strength (Kg/cm$^2$) | 770 | 770 | | 600 |
| Elongation (%) | 4.0 | 3.0 | | 1.9 |
| Total light transmittance (%) | 92 | 30 | | <20 |
| Color tone of injection molded plate | colorless transparent | semi-transparent | | yellow semi-transparent |
| Weathering resistance (accelerated exposure test, 1100 hours) | no change | no change | | craze, crack generated |
| Boiling resistance | not whitened | not whitened | | whitened |
| Solvent resistance (sec.) | 200 | 210 | | 80 |

EXAMPLES 2–3, COMPARATIVE EXAMPLES 4–5

The procedure of Example 1 was repeated, except for changing the compositions of methyl methacrylate, α-methylstyrene and maleic anhydride as indicated in Table 3 and the blend ratio relative to the methacrylic resin to 80/20, to prepare resin compositions. The evaluation results obtained are shown in Table 4.

TABLE 3

| | Composition of monomeric mixture (g) | | |
|---|---|---|---|
| | Methyl methacrylate (MMA) | α-methylstrene (α-MeSt) | Maleic anhydride (MAH) |
| Comparative example 4 | 700 | 300 | 0 |
| Example 2 | " | 240 | 60 |
| Example 3 | " | 150 | 150 |
| Example 4 | " | 60 | 240 |
| Comparative example 5 | " | 0 | 300 |

TABLE 4

| Evaluation item | Comparative example 4 | Example 2 | Example 3 | Example 4 | Comparative Example 5 |
|---|---|---|---|---|---|
| MFR (g/10 min.) | not measured because MMA 700 MeSt were not solidified but became syrupy | 15.6 | 11.0 | 9.0 | 6.2 |
| H.D.T. (°C.) | | 112 | 118 | 110 | 102 |
| Tensile strength (Kg/cm$^2$) | | 710 | 730 | 740 | |
| Elongation (%) | | 3.7 | 3.8 | 4.8 | 7.5 |
| Total light transmittance (%) | | 91 | 91.5 | 92 | 90.5 |
| Color tone of injection molded plate | | colorless transparent | colorless transparent | colorless transparent | colorless transparent |
| Weathering resistance (accelerated exposure test, 1100 hours) | | no change | no change | no change | craze generated |
| Boiling resistance | | not whitened | not whitened | slightly whitened | whitened |
| Solvent resistance (sec.) | | 120 | 140 | 110 | 30 |

EXAMPLES 5–6, COMPARATIVE EXAMPLES 6–9

Copolymers were prepared in the same manner as in Example 1 from each 1000 g of monomeric mixtures with formulations of methyl methacrylate, α-methylstyrene and maleic anhydride as shown in Table 5, and three kinds of plates of 6 mm thickness were obtained therefrom. These plates were cut, crushed and molded by means of a vent type extruder into pellets.

TABLE 5

| | Composition of monomeric mixture (g) |
|---|---|
| Copolymer A | MMA/α-MeSt/MAH = 796/114/90 |
| Copolymer B | MMA/α-MeSt/MAH = 670/180/150 |
| Copolymer C | MMA/α-MeSt/MAH = 350/350/300 |

These pellets were blended with the same methacrylic resin as employed in Example 1 as indicated in Table 6, followed by injection molding, and the physical properties of the molded products were evaluated to obtain the results as shown in Table 6.

TABLE 6

| | Copolymer [I] | Copolymer [II] | Blend ratio* (weight) | H.D.T. (°C.) | Total light transmittance (%) | Tensile strength (Kg/cm$^2$) | Elongation (%) | Color tone** | Weathering resistance*** | Boiling resistance | Solvent resistance (sec.) |
|---|---|---|---|---|---|---|---|---|---|---|---|
| Comparative example 6 | Copolymer (A) | Methacrylic copolymer | 100/0 | 112 | 92 | 700 | 3.0 | pale yellow transparent | colored in yellow | not whitened | 100 |
| Example 5 | Copolymer (A) | Methacrylic copolymer | 90/10 | 110 | 92 | 710 | 3.3 | colorless transparent | no change | not whitened | 130 |
| Comparative example 7 | Copolymer (B) | Methacrylic copolymer | 100/0 | 125 | 92 | 680 | 2.8 | yellow transparent | yellowish brown | not whitened | 85 |
| Example 6 | Copolymer (B) | Methacrylic copolymer | 75/25 | 120 | 90.5 | 720 | 4.0 | colorless transparent | no change | not whitened | 135 |
| Comparative example 8 | Copolymer (C) | Methacrylic copolymer | 100/0 | 122 | opaque | 600 | 1.1 | pearly turbid | craze generated | whitened | 40 |
| Comparative example 9 | Copolymer (C) | Methacrylic copolymer | 75/25 | 118 | opaque | 630 | 1.7 | pearly turbid | yellowish milky | whitened | 70 |

*Copolymer [I]/Copolymer [II],
**Color tone of injection molded plate
***Accelerated exposure test, 1100 hours

EXAMPLES 7–11, COMPARATIVE EXAMPLES 10–11

A monomeric mixture of 645 g of methyl methacrylate, 190 g of α-methylstyrene and 165 g of maleic anhydride was polymerized according to the same procedure as in Example 1, except for changing the amount of t-dodecyl mercaptan during partial polymerization to 3.5 g and the amount of t-dodecyl mercaptan during plate formation to 4.0 g, to prepare a plate-shaped copolymer with a thickness of 3 mm. This copolymer was cut, crushed and blended with the methacrylic polymer of Example 1 at the proportions shown in Table 7, followed by extrusion molding into pellets by means of a biaxial extruder at 250 r.p.m. at 260° C. The pellets were then injection molded into test strips, which were evaluated to obtain the results shown in Table 8.

TABLE 7

|  | Copolymer of MMA/α-MeSt/MAH (g) | Methacrylic polymer (Acrypet VH) (g) |
|---|---|---|
| Comparative example 10 | 1000 | 0 |
| Example 7 | 875 | 125 |
| Example 8 | 750 | 250 |
| Example 9 | 500 | 500 |
| Example 10 | 250 | 750 |
| Example 11 | 125 | 875 |
| Comparative example 11 | 0 | 1000 |

(trade name, produced by Ciba-Geigy AG) as an UV-absorber, 0.2 g of "JP-504" (trade name: produced by Johoku Kagaku Co.) as a peeling agent, 1 g of "Mark 329" (trade name: produced by Adeka Argus Co.) as a stabilizer and 1 g of stearic acid monoglyceride as a mold release agent. This partially polymerized mixture was poured into a mold comprising a cell formed of two tempered glass plates placed at a distance of 3 mm through an intermediary polyvinyl chloride gasket, which cell was equipped with a thermocouple, and curing by polymerization was conducted in a water bath at 80° C. Thirty minutes after confirmation of the time from immersion in the water bath until the inner temperature reaches its peak, the mold was taken out from the water bath and subjected to heat treatment in an air-heated furnace at 130° C. for 2 hours. After cooling, the glass plates were removed to obtain a resin plate with a plate thickness of about 3 mm. The plate was cut and crushed into pellets of about 3 to 4 mm.

TABLE 8

| Evaluation item | Comparative example 10 | Example 7 | Example 8 | Example 9 | Example 10 | Example 11 | Comparative example 11 |
|---|---|---|---|---|---|---|---|
| H.D.T. (°C.) | 129 | 124 | 119 | 113 | 109 | 106 | 102 |
| Total light transmittance (%) | 92 | 92 | 92 | 92 | 92 | 92 | 93 |
| Tensile strength (Kg/cm$^2$) | 650 | 670 | 720 | 740 | 780 | 790 | 790 |
| Elongation (%) | 2.5 | 3.0 | 3.3 | 4.5 | 6.8 | 7.0 | 7.2 |
| Color tone of injection molded plate | yellow transparent | colorless transparent | colorless transparent | colorless transparent | colorless transparent | colorless transparent | colorless transparent |
| Weathering resistance (accelerated exposure test, 1100 hours) | yellowish brown | pale yellow | no change | no change | no change | no change | no change |
| Boiling resistance | whitened | not whitened | not whitened | not whitened | not whitened | not whitened | not whitened |
| Solvent resistance (sec.) | 45 | 120 | 160 | 200 | 230 | 250 | |

EXAMPLES 12-13, COMPARATIVE EXAMPLES 12-14

To 1000 g of each of the monomeric mixtures containing methyl methacrylate, styrene and maleic anhydride formulated at proportions as indicated in Table 9 was added 2.5 g of t-dodecyl mercaptan as a molecular weight controller, and the mixture was placed in a separable flask of 2-liter inner capacity equipped with a condenser, a thermometer and a stirrer. Then, under stirring, nitrogen gas was blown into the flask to purge the air in the system, and on heating the mixture to 70° C., 0.2 g of 2,2'-azobis(2,4-dimethylvaleronitrile) was added thereto, and the inner temperature was maintained at 95° C. for 15 minutes, followed by cooling to room temperature, to obtain a partially polymerized product.

To 1,000 g of the partially polymerized product were added and dissolved therein under thorough stirring 4 g of lauroyl peroxide, 3.0 g of t-dodecyl meracptan as a molecular weight controller, 0.3 g of "Tinuvin P"

TABLE 9

| | Composition of monomeric mixture (g) | | | |
|---|---|---|---|---|
| | Methyl methacrylate (MMA) | Styrene (St) | p-Methyl styrene (P-MS) | Maleic anhydride (MAH) |
| Example 12 | 740 | 140 | | 120 |
| Comparative example 12 | 800 | 200 | | |
| Comparative example 13 | 800 | | | 200 |
| Comparative example 14 | | 515 | | 485 |
| Example 13 | 740 | | 140 | 120 |

These pellets were blended with a methacrylic polymer [Acrypet (registered trade name) VH, produced by Mitsubishi Rayon Co.] at a weight ratio of 60/40 and molded into pellets at 200° to 270° C. by means of a vent type biaxial extruder (extrusion temperature: 270° C.).

These pellets were injection molded under the conditions shown below, and the test strips obtained (110 mm×110 mm×2 mm thick) were evaluated to obtain the results shown in Table 10.

Injection molding machine: V-17-65 Model screw type automatic injection molding machine, produced by Nippon Seikosho Co.

Injection molding conditions:
  Cylinder temperature: 250°–260° C.
  Injection presure: 700 Kg/cm²
  Mold temperature: 60° C.

TABLE 10

| Evaluation item | Example 12 | Comparative example 12 | Comparative example 13 | Comparative example 14 | Example 13 |
|---|---|---|---|---|---|
| MFR (g/10 min., 230° C., 10 Kg) | 8.5 | 8.0 | not measured because MMA/MAH were not copolymerized | 12.0 | 8.0 |
| H.D.T. (°C.) | 110 | 99 | | 111 | 111 |
| Tensile strength (Kg/cm²) | 770 | 710 | | 540 | 760 |
| Elongation (%) | 4.5 | 3.2 | | 1.7 | 4.2 |
| Total light transmittance (%) | 92 | 30 | | 20> | 92 |
| Color tone of injection molded plate | colorless transparent | semi-transparent | | colored in yellow opaque craze, crack generated | colorless transparent |
| Weathering resistance (accelerated exposure test, 1100 hours) | no change | no change | | | no change |
| Boiling resistance | not whitened | not whitened | | whitened | not whitened |
| Solvent resistance (sec.) | 190 | 140 | | 60 | 170 |

EXAMPLES 14–16, COMPARATIVE EXAMPLES 15–16

The procedure of Example 13 was repeated, except for changing the compositions of methyl methacrylate, styrene and maleic anhydride as indicated in Table 11 and the blend ratio relative to the methacrylic resin to 80/20, to prepare resin compositions. The evaluation results obtained are shown in Table 12.

TABLE 11

| | Composition of monomeric mixture (g) | | |
|---|---|---|---|
| | Methyl methacrylate (MMA) | Styrene (St) | Maleic anhydride (MAH) |
| Comparative example 15 | 700 | 300 | 0 |
| Example 14 | " | 240 | 60 |
| Example 15 | " | 150 | 150 |
| Example 16 | " | 60 | 240 |
| Comparative example 16 | " | 0 | 300 |

TABLE 12

| Evaluation item | Comparative example 15 | Example 14 | Example 15 | Example 16 | Comparative example 16 |
|---|---|---|---|---|---|
| MFR (g/10 min.) | 19.0 | 17.0 | 13.0 | 10.5 | 8.5 |
| H.D.T. (°C.) | 98 | 107 | 112 | 108 | 102 |
| Tensile strength (Kg/cm²) | 680 | 700 | 700 | 700 | 710 |
| Elongation (%) | 2.5 | 3.4 | 3.6 | 4.2 | 7.5 |
| Total light transmittance (%) | 70 | 92 | 90.5 | 92 | 90.5 |
| Color tone of injection molded plate | milky white semi-transparent | colorless transparent | colorless transparent | colorless transparent | colorless transparent |
| Weathering resistance (accelerated exposure test, 1100 hours) | craze generated | no change | no change | no change | craze generated |
| Boiling resistance | not whitened | not whitened | not whitened | not whitened | slightly whitened |
| Solvent resistance (sec.) | 100 | 110 | 130 | 105 | 30 |

EXAMPLES 17, COMPARATIVE EXAMPLES 17–19

Copolymers were prepared in the same manner as in Example 1 from each 1000 g of monomeric mixtures with formulations of methyl methacrylate, styrene and maleic anhydride as shown in Table 13, and plates of 6 mm thickness were obtained therefrom. These plates were cut, crushed and molded similarly as in Example 12 by means of an extruder into pellets.

TABLE 13

| | Composition of monomeric mixture (g) |
|---|---|
| Copolymer (A) | MMA/St/MAH = 670/180/150 |
| Copolymer (B) | MMA/St/MAH = 350/350/300 |

These pellets were blended with the same methacrylic resin as employed in Example 12 as indicated in Table 14, followed by injection molding, and the physical properties of the molded products were evaluated to obtain the results as shown in Table 14.

TABLE 14

| | Copolymer [I] | Copolymer [II] | Blend ratio (weight) [I]/[II] | Results of evaluation | | | | | | |
|---|---|---|---|---|---|---|---|---|---|---|
| | | | | H.D.T. (°C.) | Total light transmittance (%) | Tensile strength (Kg/cm²) | Elongation (%) | Color tone* | Weathering resistance** | Boiling resistance | Solvent resistance (sec.) |
| Comparative example 17 | Copolymer (A) | Methacrylic copolymer | 100/0 | 120 | 92 | 700 | 2.8 | colored in yellow transparent | yellowish brown | not whitened | 65 |

TABLE 14-continued

| | Copolymer [I] | Copolymer [II] | Blend ratio (weight) [I]/[II] | Results of evaluation | | | | | | | |
|---|---|---|---|---|---|---|---|---|---|---|---|
| | | | | H.D.T. (°C.) | Total light transmittance (%) | Tensile strength (Kg/cm²) | Elongation (%) | Color tone* | Weathering resistance** | Boiling resistance | Solvent resistance (sec.) |
| Example 17 | Copolymer (A) | Methacrylic copolymer | 75/25 | 115 | 91 | 720 | 3.9 | colorless transparent | no change | not whitened | 100 |
| Comparative example 18 | Copolymer B | Methacrylic copolymer | 100/0 | 122 | opaque | 600 | 1.1 | pearly turbid | craze generated | whitened | 30 |
| Comparative example 19 | Copolymer B | Methacrylic copolymer | 75/25 | 116 | opaque | 630 | 1.9 | pearly turbid | craze generated | — |

*Color tone of injection molded plate
**Accelerated exposure test, 1100 hours

EXAMPLES 18-22, COMPARATIVE EXAMPLES 20-21

A monomeric mixture of 700 g of methyl methacrylate, 160 g of styrene and 140 g of maleic anhydride was polymerized according to the same procedure as in Example 12 to prepare a plate-shaped copolymer with a thickness of 3 mm. This copolymer was cut, crushed and blended with the methacrylic polymer of Example 12 at the proportions shown in Table 15, followed by extrusion molding into pellets by means of a biaxial extruder at 250 r.p.m. at 260° C. The pellets were then injection molded into test strips, which were evaluated to obtain the results shown in Table 16.

TABLE 15

| | Copolymer of MMA/St/MAH (g) | Methacrylic polymer (Acrypet VH) (g) |
|---|---|---|
| Comparative example 20 | 1000 | 0 |
| Example 18 | 875 | 125 |
| Example 19 | 750 | 250 |
| Example 20 | 500 | 500 |
| Example 21 | 250 | 750 |
| Example 22 | 125 | 875 |
| Comparative example 21 | 0 | 1000 |

TABLE 16

| Evaluation item | Comparative example 20 | Example 18 | Example 19 | Example 20 | Example 21 | Example 22 | Comparative example 21 |
|---|---|---|---|---|---|---|---|
| H.D.T. (°C.) | 121 | 118 | 116 | 111 | 107 | 105 | 102 |
| Total light transmittance (%) | 92 | 92 | 92 | 92 | 92 | 92 | 93 |
| Tensile strength (Kg/cm²) | 700 | 710 | 720 | 740 | 780 | 780 | 790 |
| Elongation (%) | 2.6 | 3.2 | 3.6 | 4.8 | 6.8 | 7.0 | 7.2 |
| Color tone of injection molded plate | pale yellow transparent | colorless transparent | colorless transparent | colorless transparent | colorless transparent | colorless transparent | colorless transparent |
| Weathering resistance (accelerated exposure test, 1100 hours) | colored in yellow | slightly pale yellow | no change | no change | no change | no change | no change |
| Boiling resistance | whitened | not whitened | not whitened | not whitened | not whitened | not whitened | not whitened |
| Solvent resistance (sec.) | 55 | 105 | 130 | 170 | 210 | 240 | 250 |

EXAMPLES 23-27, COMPARATIVE EXAMPLES 22-23

To 1000 g of a monomeric mixture containing 650 g of methyl methacrylate, 50 g of α-methylstyrene, 150 g of styrene and 150 g of maleic anhydride was added 3.5 g of t-dodecyl mercaptan as a molecular weight controller, and the mixture was placed in a separable flask of 2-liter inner capacity equipped with a condenser, a thermometer and a stirrer. Then, under stirring, nitrogen gas was blown into the flask to purge the air in the system, and on heating the mixture to 70° C., 0.2 g of azobisisobutyronitrile as a polymerization initiator was added thereto, and the inner temperature was maintained at 95° C. for 15 minutes, followed by cooling to room temperature, to obtain a partially polymerized product of 600 centipoise.

To 1,000 g of the partially polymerized product were added and dissolved therein under thorough stirring 4 g of lauroyl peroxide, 3.0 g of t-dodecyl meracptan as a molecular weight controller, 0.2 g of "JP-504" (trade name, produced by Johoku Kagaku Co.) as a peeling agent, 0.3 g of "Tinuvin P" (trade name: produced by Ciba-Geigy AG) as an UV-absorber, 1 g of "Mark 329" (trade name: produced by Adeka Argus Co.) as a stabilizer and 1 g of stearic acid monoglyceride as a mold release agent. This partially polymerized mixture was poured into a mold comprising a cell formed of two tempered glass plates place at a distance of 3 mm through an intermediary polyvinyl chloride gasket, which cell was equipped with a thermocouple, and curing by polymerization was conducted in a water bath at 80° C. Thirty minutes after confirmation of the time from immersion in the water bath until the inner temperature reaches its peak, the mold was taken out from the water bath and subjected to heat treatment in an air-heated furnace at 130° C. for 2 hours. After cooling, the glass plates were removed to obtain a resin plate with a plate thickness of about 3 mm. The plate was cut and crushed into pellets of about 3 to 4 mm. These pellets were blended by a Henshell mixer with a methacrylic polymer "Acrypet (registered trade name) VH" (produced by Mitsubishi Rayon Co.) at the weight ratios as indicated in Table 17 and molded into pellets by means of a vent type biaxial extruder at a temperature of 265° C.).

These pellets were injection molded under the conditions shown below, and the test strips obtained (110 mm×110 mm×2 mm thick) were evaluated to obtain the results shown in Table 18.

Injection molding machine: V-17-65 Model screw type automatic injection molding machine, produced by Nippon Seikosho Co.

Injection molding conditions:
  Cylinder temperature: 250°–260° C.
  Injection presure: 700 Kg/cm²
  Mold temperature: 60° C.

TABLE 17

|  | Copolymer of MMA/-MeSt/St/MAH copolymer | Methacrylic polymer (Acrypet VH) (g) |
|---|---|---|
| Comparative example 22 | 1000 | 0 |
| Example 23 | 875 | 125 |
| Example 24 | 750 | 250 |
| Example 25 | 500 | 500 |
| Example 26 | 250 | 750 |
| Example 27 | 125 | 875 |
| Comparative example 23 | 0 | 1000 |

TABLE 18

| Evaluation item | Comparative example 22 | Example 23 | Example 24 | Example 25 | Example 26 | Example 27 | Comparative example 23 |
|---|---|---|---|---|---|---|---|
| H.D.T. (°C.) | 128 | 124 | 121 | 115 | 109 | 106 | 102 |
| Total light transmittance (%) | 92 | 92 | 92 | 92 | 92 | 92 | 93 |
| Tensile strength (Kg/cm²) | 720 | 730 | 750 | 770 | 780 | 790 | 790 |
| Elongation (%) | 2.7 | 3.3 | 4.0 | 5.0 | 6.9 | 7.0 | 7.2 |
| Color tone of injection molded plate | pale yellow transparent | colorless transparent | colorless transparent | colorless transparent | colorless transparent | colorless transparent | colorless transparent |
| Weathering resistance (accelerated exposure test, 1100 hours) | yellow | slightly pale yellow | no change | no change | no change | no change | no change |
| Boiling resistance | whitened | not whitened | not whitened | not whitened | not whitened | not whitened | not whitened |
| Solvent resistance (sec.) | 65 | 110 | 140 | 160 | 210 | 230 | 250 |

EXAMPLES 28–31, COMPARATIVE EXAMPLES 24

To each 1000 g of the monomeric mixtures containing methyl methacrylate, α-methylstyrene, styrene and maleic anhydride formulated at proportions as indicated in Table 19 was added 2.6 g of t-dodecyl mercaptan as a molecular weight controller, and the mixture was placed in a 2-liter separable flask equipped with a condenser, a thermometer and a stirrer. Then, under stirring, nitrogen gas was blown into the flask to purge the air in the system, and on heating the mixture to 70° C., 0.25 g of azobisisobutyronitrile as a polymerization initiator was added thereto, and the inner temperature was maintained at 95° C. for 15 minutes, followed by cooling to room temperature, to obtain a partially polymerized product.

To 1,000 g of the partially polymerized product were added and dissolved therein under thorough stirring 4 g of lauroyl peroxide, 3.0 g of t-dodecyl mercaptan as a molecular weight controller, 0.2 g of "JP-504" (trade name, produced by Johoku Kagaku Co.) as a peeling agent, 0.1 g of "Mark 329" (trade name: produced by Adeka Argus Co.) as a stabilizer, 0.2 g of "Tinuvin P" (trade name: produced by Ciba Geigy AG) as an UV-absorber and 1 g of stearic acid monoglyceride as a mold release agent. This partially polymerized mixture was poured into a mold comprising a cell formed of two tempered glass plates place at a distance of 3 mm through an intermediary polyvinyl chloride gasket, which cell was equipped with a thermocouple, and curing by polymerization was conducted in a water bath at 80° C. Thirty minutes after confirmation of the time from immersion in the water bath until the inner temperature reaches its peak, the mold was taken out from the water bath and subjected to heat treatment in an air-heated furnace at 130° C. for 2 hours. After cooling, the glass plates were removed to obtain a resin plate with a plate thickness of about 3 mm. The plate was cut and crushed into pellets of about 3 to 4 mm.

TABLE 19

| | Composition of monomeric mixture (g) | | | |
|---|---|---|---|---|
| | Methyl methacrylate (MMA) | α-Methyl styrene (α-MeSt) | Styrene (St) | Maleic anhydride (MAH) |
| Example 28 | 700 | 50 | 125 | 125 |
| Example 29 | 700 | 50 | 150 | 100 |
| Example 30 | 700 | 100 | 50 | 150 |
| Example 31 | 700 | 150 | 50 | 100 |
| Example 32 | 765 | 35 | 100 | 100 |
| Comparative example 24 | 150 | 250 | 300 | 300 |

These pellets were blended with the same methacrylic polymer as used in Example 25 at weight ratios as indicated in Table 20 molded into pellets by means of a 40 mm φ vent type monoaxial extruder (extrusion temperature: 265° C.). These pellets were injection molded under the conditions shown below, and evaluated for their physical properties to obtain the results shown in Table 21.

TABLE 20

| | Copolymer of MMA/α-MeSt/St/MAH copolymer | Methacrylic polymer (Acrypet VH) (g) |
|---|---|---|
| Example 28 | 750 | 250 |
| Example 29 | 600 | 400 |

TABLE 20-continued

| | Copolymer of MMA/α-MeSt/St/MAH copolymer | Methacrylic polymer (Acrypet VH) (g) |
|---|---|---|
| Example 30 | 400 | 600 |
| Example 31 | 300 | 700 |
| Example 32 | 850 | 150 |
| Comparative example 24 | 750 | 250 |

TABLE 21

| | MFR (g/10 min.) | H.D.T. (°C.) | Tensile strength (Kg/cm²) | Total light transmittance (%) | Color* tone | Boiling resistance | Weathering resistance** | Solvent resistance (sec.) |
|---|---|---|---|---|---|---|---|---|
| Example 28 | 7.6 | 115 | 790 | 92 | colorless transparent | not whitened | no change | 160 |
| Example 29 | 8.2 | 112 | 760 | 92 | colorless transparent | not whitened | no change | 150 |
| Example 30 | 7.0 | 117 | 750 | 92 | colorless transparent | not whitened | no change | 170 |
| Example 31 | 8.5 | 117 | 740 | 92 | colorless transparent | not whitened | no change | 150 |
| Example 32 | 6.0 | 114 | 750 | 92 | colorless transparent | not whitened | slightly pale yellow | 120 |
| Comparative example 24 | 7.0 | 140 | 500 | opaque | opaque | whitened | craze generated | 45 |

*Color tone of injection molded plate
**Accelerated exposure test, 1100 hours

EXAMPLES 33–35, COMPARATIVE EXAMPLE 25

A resin plate with a thickness of 3 mm was prepared according to entirely the same procedure as in Example 23 except for using a monomeric mixture comprising 665 g of methyl methacrylate, 55 g of α-methylstyrene, 140 g of p-methylstyrene and 140 g of maleic anhydride and changing the amount of t-dodecyl mercaptan during partial polymerization to 4.0 g. The plate was cut, crushed and then blended with "Acrypet VH" (trade name, produced by Mitsubishi Rayon Co.) at the proportions (parts by weight) as indicated in Table 22. The blended products were molded into pellets by means a biaxial extruder (temperature 265° C.).

TABLE 22

| | Copolymer of MMA/α-MeSt/p-MeSt/MAH | Methacrylic polymer (Acrypet VH) (g) | MMA-BA* copolymer |
|---|---|---|---|
| Comparative example 25 | 500 | | 500 |
| Example 33 | 750 | 250 | |
| Example 34 | 500 | 500 | |
| Example 35 | 250 | 750 | |

*Methyl methacrylate-butyl acrylate copolymer (Weight ratio = 50:50)

These pellets were injection molded similarly as in Example 23 and the resultant test strips were evaluated to obtain the results as shown in Table 23.

TABLE 23

| Evaluation item | Comparative example 25 | Example 33 | Example 34 | Example 35 |
|---|---|---|---|---|
| H.D.T. (°C.) | 90 | 122 | 116 | 109 |
| Total light transmittance (%) | 60 | 92 | 92 | 92 |
| Tensile strength (Kg/cm$^2$) | 700 | 740 | 760 | 780 |
| Elongation (%) | 4.2 | 6.6 | 4.3 | 3.9 |
| Color tone of injection molded plate | semi-transparent | colorless transparent | colorless transparent | colorless transparent |
| Weathering resistance (accelerated exposure test, 1100 hours) | no change | no change | no change | no change |
| Boiling resistance | not whitened | not whitened | not whitened | not whitened |
| Solvent resistance (sec.) | 140 | 180 | 130 | 110 |

We claim:

1. A heat-resistant transparent methacrylic resin composition which comprises 5 to 95% by weight of a copolymer [I] obtained by (A) copolymerizing 40 to 98% by weight of methyl methacrylate, 1 to 25% by weight of an aromatic vinyl compound and 1 to 25% by weight of maleic anhydride or (B) copolymerizing 40 to 97% by weight of methyl methacrylate, 1 to 20% by weight of an alpha-methyl styrene, 1 to 20% by weight of styrene or vinyl toluene and 1 to 20% by weight of maleic anhydride and 95 to 5% by weight of polymer [II] obtained by copolymerizing 80 to 100% by weight of methyl methacrylate and 0 to 20% by weight of at least one other copolymerizable ethylenic monomer.

2. A heat-resistant methacrylic resin composition according to claim 1, wherein the aromatic vinyl compound is selected from the group consisting of α-methylstyrene, styrene and vinyltoluene.

3. A heat-resistant methacrylic resin composition according to claim 1, wherein the copolymer [I] is a copolymer obtained by copolymerizing 50 to 98% by weight of methyl methacrylate, 1 to 25% by weight of styrene or vinyltoluene and 1 to 25% by weight of maleic anhydride.

4. A heat-resistant methacrylic resin composition according to claim 1, wherein the copolymer [I] is a copolymer obtained by copolymerizing 50 to 98% by weight of methyl methacrylate, 1 to 25% by weight of α-methylstyrene and 1 to 25% by weight of maleic anhydride.

5. A heat-resistant methacrylic resin composition according to claim 1, wherein the copolymer [I] is a copolymer obtained by copolymerizing 40 to 97% by weight of methyl methacrylate, 1 to 20% by weight of styrene or vinyl toluene, 1 to 20% by weight of α-methylstyrene and 1 to 20% by weight of maleic anhydride.

6. A heat-resistant methacrylic resin composition according to claim 1, wherein the other copolymerizable ethylenic monomer is at least one selected from the group consisting of an alkyl acrylate of which the alkyl group has 1 to 12 carbon atoms, an alkyl methacrylate of which the alkyl group has 2 to 12 carbon atoms, cyclohexyl methacrylate, styrene and acrylonitrile.

7. A heat-resistant methacrylic resin composition according to claim 1, consisting of not less than 10 and less than 90% by weight of the copolymer [I] and more than 10 and not more than 90% by weight of the copolymer [II].

8. A heat-resistant methacrylic resin composition according to claim 7, consisting of 15 to 85% by weight of the copolymer [I] and 85 to 15% by weight of the copolymer [II].

9. A heat-resistant methacrylic resin composition according to claim 8, consisting of 20 to 80% by weight of the copolymer [I] and 80 to 20% by weight of the copolymer [II].

10. A heat-resistant methacrylic resin composition according to claim 1, having a heat distortion temperature of 105° C. or higher as measured according to the method of ASTM D-648.

11. A heat-resistant methacrylic resin composition according to claim 10, having a heat distortion temperature of 110° C. or higher as measured according to the method of ASTM D-648.

12. A heat-resistant methacrylic resin composition according to claim 11, having a heat distortion temperature of 115° C. or higher as measured according to the method of ASTM D-648.

13. A heat-resistant methacrylic resin composition according to claim 3, wherein the copolymer [I] is a copolymer obtained by copolymerizing 65 to 90% by weight of methyl methacrylate, 5 to 20% by weight of styrene or vinyltoluene and 5 to 15% by weight of maleic anhydride.

14. A heat-resistant methacrylic resin composition according to claim 4, wherein the copolymer [I] is a copolymer obtained by copolymerizing 65 to 90% by weight of methyl methacrylate, 5 to 18% by weight of α-methylstyrene and 5 to 17% by weight of maleic anhydride.

15. A heat-resistant methacrylic resin composition according to claim 5, wherein the copolymer [I] is a copolymer obtained by copolymerizing 60 to 90% by weight of methyl methacrylate, 1 to 10% by weight of α-methylstyrene, 5 to 15% by weight of styrene or vinyltoluene and 4 to 15% by weight of maleic anhydride.

16. A heat-resistant methacrylic resin composition according to claim 3, wherein the ratio of α/γ (where α is a mole number of styrene or vinyltoluene and γ is a mole number of maleic anhydride) is 0.9 to 1.7.

17. A heat-resistant methacrylic resin composition according to claim 4, wherein the ratio of β/γ (where β is a mole number of α-methylstyrene and γ is a mole number of maleic anhydride) is 0.9 to 1.7.

18. A heat-resistant methacrylic resin composition according to claim 5, wherein the ratio of (α+β)/γ (where α is a mole number of styrene or vinyltoluene, β is a mole number of α-methylstyrene and γ is a mole number of maleic anhydride) is 0.9 to 1.7.

* * * * *